Figure 1:
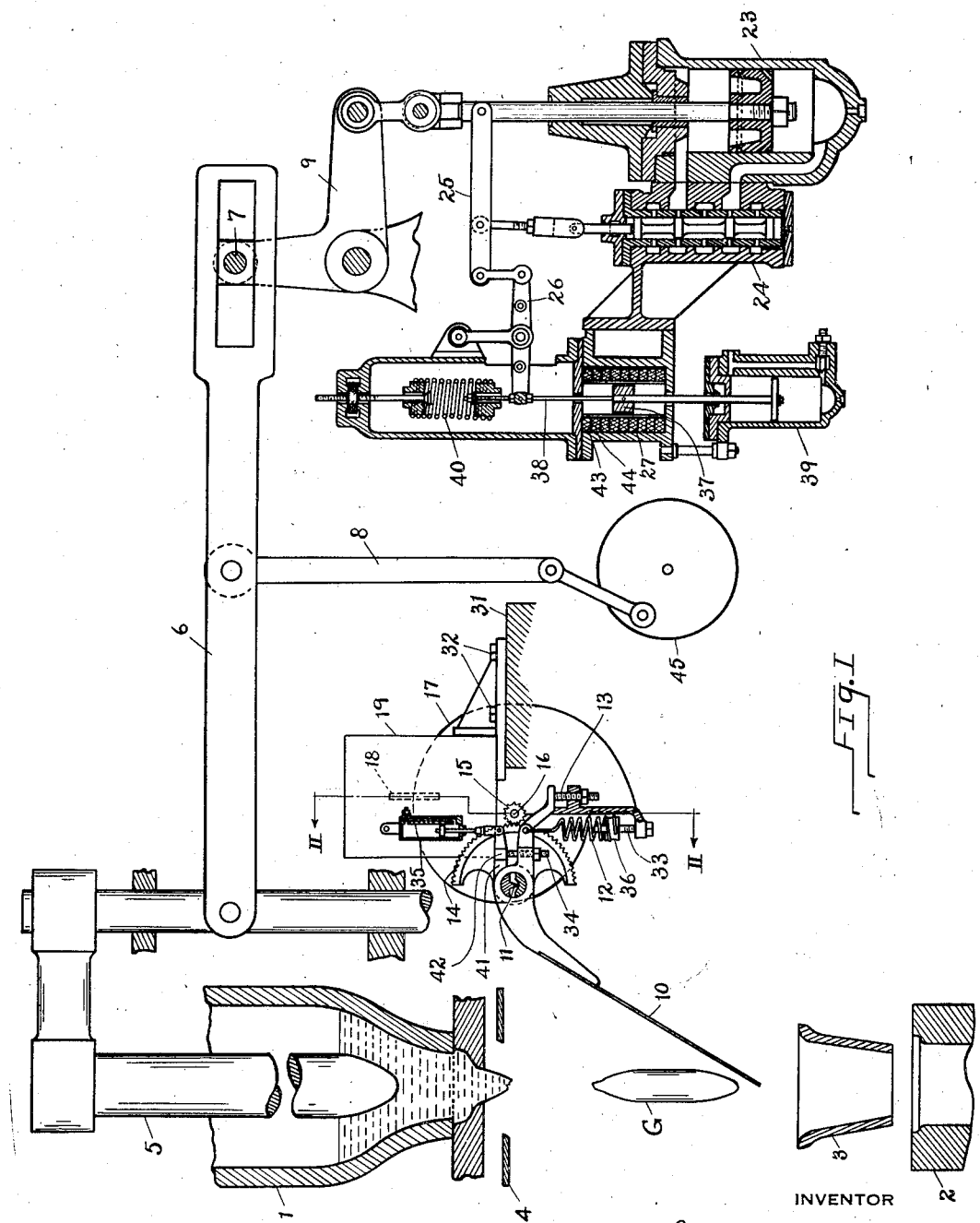

Aug. 25, 1931.   J. SYLVESTER   1,820,508
GLASS FEEDING APPARATUS
Filed Aug. 30, 1930   2 Sheets-Sheet 1

INVENTOR
Julius Sylvester
by Christy Christy and Wharton
his attorneys

Aug. 25, 1931. J. SYLVESTER 1,820,508
GLASS FEEDING APPARATUS
Filed Aug. 30, 1930 2 Sheets-Sheet 2
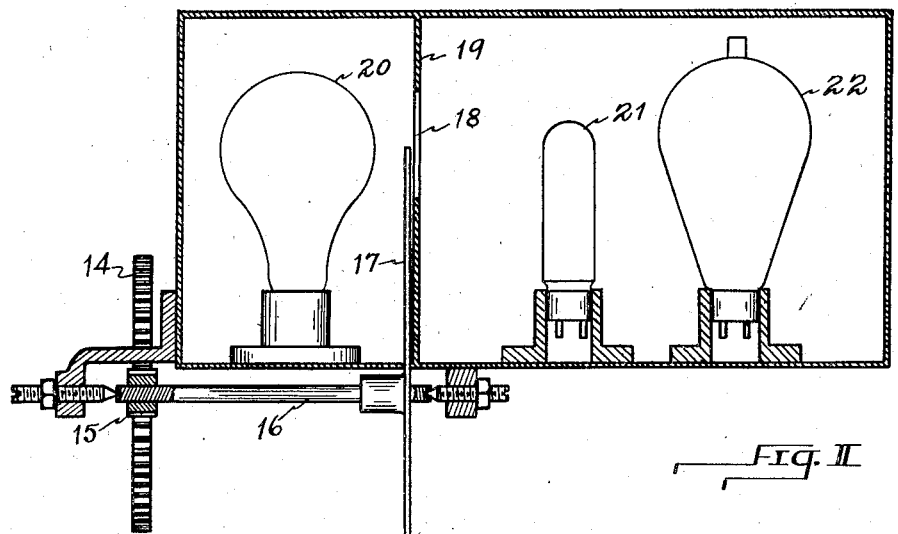
Fig. II
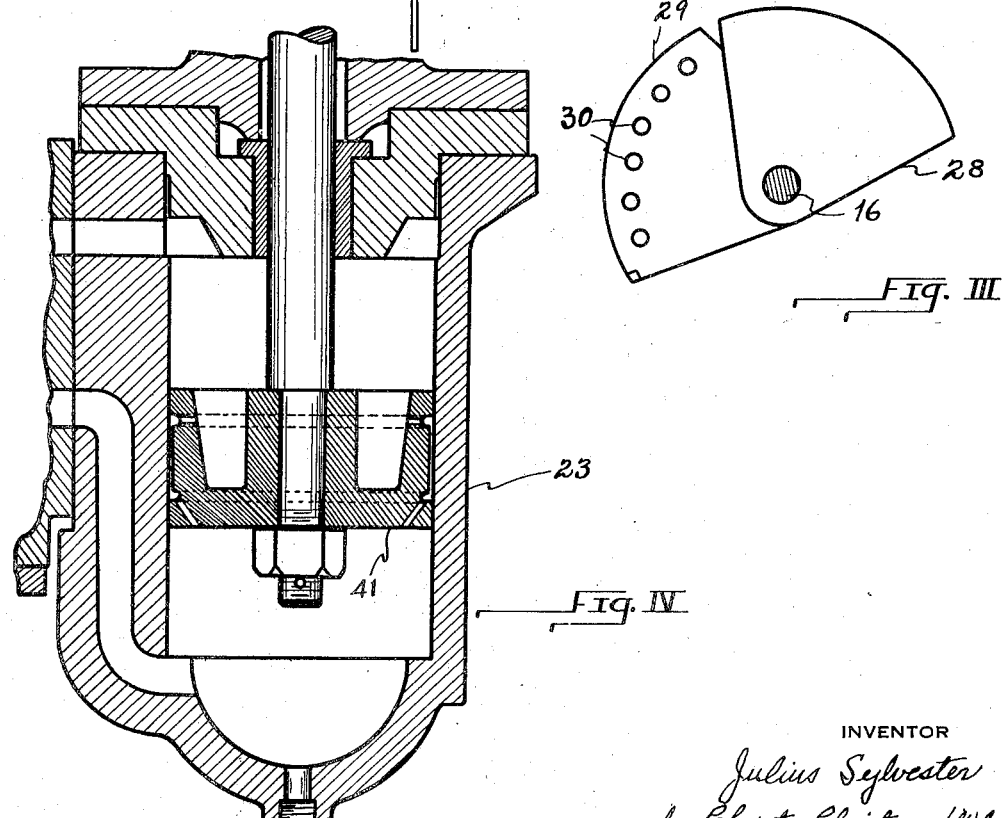
Fig. III
Fig. IV
INVENTOR
Julius Sylvester
by Christy Christy and Wharton
his attorneys Patented Aug. 25, 1931

1,820,508

UNITED STATES PATENT OFFICE

JULIUS SYLVESTER, OF WASHINGTON, PENNSYLVANIA, ASSIGNOR TO SIMPLEX ENGINEERING COMPANY, A CORPORATION OF DELAWARE

GLASS FEEDING APPARATUS

Application filed August 30, 1930. Serial No. 478,823.

In the operation of machinery for molding and blowing glass articles it is an established practice to cause the glass in plastic condition to descend in segregated bodies called gobs from the glass tank to the mold. The glass is delivered from the tank through a downwardly opening orifice, and the formation and segregation of the gobs are effected by the reciprocation vertically within the body of molten glass and above the orifice of a member called a feeder needle, and by the cutting-off action of a pair of shears arranged beneath the orifice. There is need to control and to adjust the range of reciprocation of the feeder needle, particularly in the upward limit of its range of reciprocation, not only to adapt the apparatus for service with molds of different capacities, but also to make compensation for variations which tend to disturb uniformity, of which variation in fluidity is the chief. It is the usual practice for an attendant, noting in the course of a run variation in weight in the successive finished articles, to adjust manually the range of reciprocation of the feeder needle, and thus to bring the subsequently formed articles back to the desired standard. My invention is found in means for accomplishing automatically such adjustment.

In the accompanying drawings Fig. I is a diagrammatic view, partly in side elevation, partly in vertical section, of the apparatus of my invention shown in its association with the gob-forming mechanism of a glass-molding machine. Fig. II is a fragmentary view in section, on the plane indicated by the line II—II, Fig. I. Fig. III is a fragmentary view in section, illustrating an alternative piece of apparatus, capable of use in place of that particularly shown in Fig. II. Fig. IV is a view in vertical section showing to larger scale a detail of the organization of Fig. I.

Referring, first, to Fig. I, a portion of a glass tank adjacent the delivery orifice is shown at 1; and, beneath the orifice, a mold at 2 and a funnel at 3. A pair of shears for cutting the gob free is shown at 4, arranged immediately beneath the orifice in the tank. The feeder needle is shown at 5, borne on a lever 6. The lever is pivoted at 7, and is oscillated on its pivot by means of a link 8, which will be understood to reciprocate through a a predetermined range and in a predetermined periodicity by suitable means, diagrammatically indicated in a crank-disk 45. As the link reciprocates the feeder needle, through the instrumentalities described, correspondingly reciprocates. Given such operating instrumentalities, the range of reciprocation of the feeder needle may be rendered adjustable. Means of adjustment here are found in the slotting of the lever 6 and articulating it in such slotted portion upon a pin borne by a bell-crank lever 9—the bell-crank lever being pivoted on a fixed support. Manifestly, as the bell-crank lever 9 is swung, the range of reciprocation of the feeder needle is varied; and, particularly, the upward limit of the range of reciprocation is varied, to effect the delivery of a larger or smaller gob of glass. The automatic apparatus of my invention controls the swinging of the bell-crank lever 9.

A lever 10 with paddle-shaped arm rocks in vertical plane on a knife-edge 11, upon a suitable fulcrum block. A spring 12 engaging the lever tends to swing it in clockwise direction, as seen in Fig. I, and holds it yieldingly to engagement with a stop 13. The paddle-shaped arm of the lever so mounted and sustained extends obliquely downward and athwart the path of descent of a gob of glass from shears 4 to funnel 3.

A toothed segment 14 is mounted for rotation in vertical plane, coaxially with lever 10, and, integrated with segment 14, an arm 41 extends radially with respect to the axis of turning. Lever 10 is equipped with an adjustable stop 34 which, engaging from beneath a shoulder 42 formed on arm 41, causes the arm 41 to rotate counter-clockwise in unison with lever 10. Clockwise turning of lever 10, however, leaves arm 41 free to respond to other forces tending to rotate it.

The toothed segment 14 meshes with a pinion 15 borne integrally by a shaft 16, which shaft is delicately trunnioned in a fixed support. A descending gob of glass G, making impact upon the paddle-shaped arm of lever 10, swings the lever in counter-clockwise direction (Fig. I); and the range of swing, and the consequent range of turning of shaft 16, will be greater or less, as the weight of the gob varies; for a heavier gob will strike the lever with greater impact than a lighter one.

Means are provided for correlating rotatable shaft 16 with bell-crank lever 9, to the end that variation in the range of turning of shaft 16 shall effect a corresponding shift in the position of lever 9, and so alter the range of reciprocation of feeder needle 5: the tendency to the delivery of an over-heavy gob will thus be corrected in a correspondingly diminished range of reciprocation of feeder needle 5, and the tendency to deliver a light gob will be corrected in an increased range of reciprocation of the feeder needle.

I have shown the means for correlating shaft rotation and lever swing in two forms; the preferred form is that particularly shown in Figs. I and II, and involves the use of a thyratron.

Shaft 16 carries integrally a spiral disk 17 which, as the shaft turns, screens in greater or less degree a slot 18 in a wall 19. As the slot is in greater or less degree uncovered, light in greater or less quantity emitted from a source 20 is received by a photo-electric cell 21. Under such varying quantity of light the photo-electric cell controls the amount of current which passes through a thyratron tube 22.

The bell-crank lever 9 is linked to the stem of the piston in a vertically arranged hydraulic cylinder 23, with which is associated a hydraulic relay 24. The operating lever 25 of the relay is fulcrumed to the piston stem. To the lever 25 a second lever 26 is linked which second lever is capable of being swung by a solenoid 27. The energizing coils 43, 44, etc. of the solenoid are distributed longitudinally of the structure and they are in known manner so arranged in circuit with the thyratron tube 22, that, as the current which passes through the thyratron tube varies, the longitudinal distribution of the energized coils will vary, and in consequence the armature 37 will move, the lever 26 will correspondingly swing, the positions of the hydraulic relay and of the piston in the hydraulic cylinder will correspondingly adjust themselves, and the bell-crank lever 9 will swing. Thus any tendency to excess (or to deficiency) in the turning of shaft 16, due to variation in the weight of the falling gob G, expresses itself in a slight but sufficient swinging of bell-crank lever 9 and a corrective adjustment of the range of reciprocation of feeder needle 5: if the gob tends to become too heavy, the stroke of the needle is thus automatically reduced; if the gob tends to become too light, the stroke is lengthened.

Alternatively, and without using the thyratron, the shaft 16 may, as illustrated in Fig. III, carry a segment 28 which, as the shaft rotates shall advance upon a stationary plate 29 arranged adjacent and in parallelism to it. The plate 29 carries a plurality of contact pieces 30, and the segment 28 as it advances makes contact with and closes circuits through these successive contact pieces. These successively closed circuits include coils of solenoid 27, to the end that as the contacts are successively made the effective region of the solenoid will shift longitudinally, and the lever 26 will be swung, with the effect already described.

The thyratron tube with its control apparatus, including the lever 10 and the fulcrum on which it swings, the stop 13 and the spring 12, the shaft 16 and the parts which it carries constitute a unit, adjustable on a support 31 toward and from the line of the descent of the gobs, as is indicated by the bolts 32.

The stop 13 is adjustable, to the end that the angularity of the paddle-shaped arm of lever 10 in its position athwart the line of descent of the gobs may be accurately adjusted.

The tension of spring 12 is by means of a screw 33 adjustable, to adapt the apparatus to function in desired manner, whatever be the actual gob weight to be maintained as standard.

The segment 14 is by means of the screw 34 angularly adjustable upon lever 10, to the end that for every setting of the lever (by adjustment of stop 13) the proper setting of the segment relatively to disk 17 may be established.

The toothed segment, after having been turned counter-clockwise, is, on the return swing of lever 10, left free as has been said. Gravity, acting upon it and upon the associated parts, tends to cause it to turn clockwise until the shoulder 42 rests again upon the stop 34. A dash-pot retards the turning of the segment, to the end that each succeeding swing of lever 10 and will find disk 17 but slightly moved from the position to which it had previously been brought. If a diminution in the range of swing of lever 10 persists, the dash-pot retarded disk will presently turn so far as to effect a change in the energizing of the solenoid coils 43, 44, etc., and a shifting of the armature 37; if an enlargement in the range of swing persists, the dash-pot retarded disk will presently be driven so far in counter-clockwise direction as to effect a change of opposite character in the energizing of the solenoid coils, and a consequent opposite shifting of the armature.

The solenoid 27 is vertically arranged, and the armature 37 moves vertically within it. The armature 37 is carried on a rod 38 and by this rod connection is made to lever 26. Reciprocation of rod 38 is cushioned by a dash-pot 39, and a spring 40 of adjustable effective resiliency counteracts the weight of the rod and of all connected parts, so that the rod is delicately responsive to operation by the solenoid.

The two dash-pots 35 and 39 have conjoint effect in the minimizing of fluctuation.

The lever 25, articulated in the manner shown and described, affords compensation and correction for factors otherwise disturbing. For instance, if leakage were to increase around the piston in cylinder 23, an automatic adjustment of the hydraulic relay would follow, and the apparatus would continue to function with undisturbed accuracy.

Friction of piston 41 within cylinder 23 may be reduced and rendered relatively negligible by the minute construction shown. The generally cylindrical body of the piston is grooved circumferentially near its opposite ends, and ducts open from the chamber above and below the piston to the several grooves. Between the two grooves the body of the piston is slightly reduced in diameter. Such a structure, admitting of gradual equalization of pressure on the two sides of the piston, leaves it delicately responsive to a momentary disturbance of such condition of equality of pressure.

With the descent of each gob, disk 17 will, through the instrumentalities described, be rotated through a range ordinarily less than a complete rotation, and a range which is minutely proportioned to the weight of the particular gob. So long as the gobs are uniform in weight, the range of successive turnings of disk 17 will be uniform. If succeeding gobs are over weight or under weight the range of turning will be correspondingly greater or less. By the action of the thyratron, with each descent of the gob certain of the coils of the solenoid 27 will be energized. So long as the weight of succeeding gobs is constant, the coils of the solenoid which are energized will be the same and the balanced armature 37 will continue stationary. In case there is variation in the weight of succeeding gobs there will be change in the longitudinal distribution within the solenoid of the coils which are energized, and a consequent shifting of the armature 37 in its position. Shifting of the armature will, through the instrumentalities described, effect operation of the hydraulic motor 23, a swinging of bell-crank lever 9, and a change in the range of stroke of the feeder needle 5, with the gob weight will be automatically restored to the desired standard.

The delicately poised lever 10 and the delicately balanced armature 37 may by the means described be always readjusted and brought back to proper positions, in case through prolonged service they depart therefrom.

The obliquity of and the precise position of the lever 10 may be nicely adjusted by cooperation of the adjusting means found in the screw 13 and the bolts 32.

Adaptability to different standard gob weights is found in the screw 33, by which the effective tension of spring 12 may be varied.

I claim as my invention:

1. In glass-shaping machinery and in combination with gob-delivering apparatus including a reciprocating feeder needle, a spring-backed swinging arm adapted to sustain the impact of a descending gob of glass and to swing through a greater or less range, according to the weight of the gob, means for reciprocating said feeder needle, and reciprocation-controlling means interposed between said swinging arm and said feeder needle reciprocating means, whereby range of reciprocation of the feeder needle reciprocating means automatically decreases in response to increase in the range of swing of said arm.

2. In glass-shaping machinery the combination with a glass-tank having a gob-delivering orifice and a feeder needle borne by a reciprocating lever, a movable member subject to the impact of a descending gob and movable through a greater or less range as the weight of the gob increases or decreases, and means subject to the movement of said movable member controlling the range of reciprocation of said lever.

3. In glass-shaping machinery the combination with a glass-tank having a gob-delivering orifice and a feeder needle borne by a reciprocable lever, a movable member subject to the impact of a descending gob and movable through a greater or less range as the weight of the gob increases or decreases, and means subject to the movement of said movable member for varying the effective length of said lever.

4. In glass-shaping machinery the combination with a glass tank having a gob-delivering orifice, a movable fulcrum, a lever reciprocating on said fulcrum, a feeder needle reciprocating in accord with lever reciprocation and cooperating to deliver a succession of gobs of glass through said orifice, and a member adapted to be engaged by a descending gob of glass and movable through a greater or less range according to the weight of the gob of glass, and means for shifting said movable fulcrum in response to range of movement of said movable member.

5. In glass-shaping machinery and in combination with gob-delivering apparatus which includes a feeder needle, means for reciprocating said feeder needle, such means being adjustable, whereby the range of feeder needle reciprocation may be varied, a movable member arranged in the path of the gobs delivered by said apparatus and adapted to move through a greater or less range as the succeeding gobs vary in weight, a solenoid including a plurality of longitudinally disposed coils and an armature movable longitudinally, according to the selective energizing of such coils, the said means for reciprocating said feeder needle being adjustable in response to the position of the armature of said solenoid, and a thyratron tube operating in response to the movement of said movable member and effecting the selective energizing of the coils of said solenoid.

6. In a glass-shaping machinery and in combination with gob-delivering apparatus which includes a feeder needle, means for reciprocating said feeder needle, such means including a lever reciprocating on a movable fulcrum, means for moving such fulcrum longitudinally of said lever, such means including an hydraulic cylinder, a lever adapted to swing on a fixed pivot, means for causing said lever to swing through a greater or less range according to variation in the weight of a succession of gobs delivered by said apparatus, the said hydraulic cylinder being subject to the control of the last-named swinging lever.

7. In glass-shaping machinery and in combination with gob-delivering apparatus which includes a feeder needle, means for reciprocating said feeder needle, such means including a lever reciprocating on a movable fulcrum, means for moving such fulcrum longitudinally of said lever, such means including a vertically arranged hydraulic cylinder containing a piston with extended stem, an hydraulic relay associated with said cylinder such relay including a vertically reciprocable member, a lever pivoted to the stem of the piston of said hydraulic cylinder, the vertically reciprocable member of the said relay being connected to said lever, a lever linked to the lever last named and adapted to swing on a fixed pivot, and means subject to the weight of a descending gob of glass for causing the lever so pivoted on a fixed support to swing through a greater or less range, according to variation in the weight of succeeding gobs.

8. In glass-making machinery and in combination with a container for molten glass having a downwardly opening discharge outlet, adjustable discharge-regulating means associated with such outlet and controlling the discharge through and suspension beneath such outlet of a succession of mold-charge masses, periodically acting severing means for severing successive mold charges, a movable member subject to the impact of a severed and freely falling mold charge and movable through a range which is greater or less as the weight of the mold charge is greater or less, the said discharge-regulating means in their adjustability being responsive to the range of movement of said movable member.

9. In glass-making machinery and in combination with a container for molten glass having a downwardly opening discharge outlet, adjustable discharge-regulating means associated with such outlet and controlling the discharge through and the suspension beneath such outlet of a succession of mold-charge masses, periodically acting severing means for severing successive mold charges, said adjustable discharge-regulating means including a lever of variable effective length, an electromagnet including a plurality of coils and a single armature, responsive in its movement to the energizing of one or another of the said coils, and means responsive to the movement of the said armature for varying the effective length of such lever, a movable member subject to the impact of a severed and freely falling mold charge and movable through a range which is greater or less as the weight of the mold charge is greater or less, the movement of said movable member being effective to energize one or another of the coils of said solenoid, according as its range of movement is great or less.

10. In glass-making machinery, and in combination with a container for molten glass having a downwardly opening discharge outlet, of adjustable discharge-controlling means associated therewith and controlling the discharge through and the suspension beneath the said outlet of successive mold-charge masses, periodically acting severing means for severing successive mold charges, and contact means responsive to the impact of a severed and freely falling mold charge to adjust automatically the said discharge-controlling means in accordance with variation in the weight of succeeding mold charges.

In testimony whereof I have hereunto set my hand.

JULIUS SYLVESTER.